(12) United States Patent
Parker et al.

(10) Patent No.: US 7,968,662 B2
(45) Date of Patent: Jun. 28, 2011

(54) REPELLENT COMPOSITION CONTAINING GRAFT COPOLYMER, GRAFT COPOLYMER AND METHOD OF PREPARING GRAFT COPOLYMER

(75) Inventors: Anthony A. Parker, Mantua, NJ (US); Joseph J. Marcinko, Mantua, NJ (US); Franklin A. Adamsky, Decatur, AL (US); Bradley H. Hartong, Decatur, AL (US); Takashi Enomoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 626 days.

(21) Appl. No.: 11/997,708

(22) PCT Filed: Aug. 4, 2006

(86) PCT No.: PCT/JP2006/315890
§ 371 (c)(1),
(2), (4) Date: Feb. 27, 2008

(87) PCT Pub. No.: WO2007/018276
PCT Pub. Date: Feb. 15, 2007

(65) Prior Publication Data
US 2009/0035508 A1 Feb. 5, 2009

Related U.S. Application Data

(60) Provisional application No. 60/705,499, filed on Aug. 5, 2005.

(51) Int. Cl.
C08F 14/18 (2006.01)
(52) U.S. Cl. ..... 526/242; 526/250; 526/253; 526/317.1; 526/319
(58) Field of Classification Search ............. 526/242, 526/250, 253, 317.1, 319
See application file for complete search history.

(56) References Cited

U.S. PATENT DOCUMENTS

| | | | |
|---|---|---|---|
| 2,922,768 A | 1/1960 | Mino et al. | |
| 3,300,546 A * | 1/1967 | Baechtold | 525/57 |
| 3,711,573 A | 1/1973 | Nagy | |
| 4,375,535 A | 3/1983 | Kightlinger et al. | |
| 4,376,852 A | 3/1983 | Lindenfors | |
| 4,806,581 A | 2/1989 | Walker | |
| 5,070,121 A | 12/1991 | Hinterwaldner et al. | |
| 5,130,394 A | 7/1992 | Nguyen et al. | |
| 5,362,847 A | 11/1994 | Miller et al. | |
| 5,520,962 A | 5/1996 | Jones, Jr. | |
| 5,614,123 A | 3/1997 | Kubo et al. | |
| 5,667,885 A | 9/1997 | Nguyen et al. | |
| 5,688,157 A | 11/1997 | Bradley et al. | |
| 5,834,384 A | 11/1998 | Cohen et al. | |
| 5,851,595 A | 12/1998 | Jones, Jr. | |
| 6,136,896 A | 10/2000 | Lee et al. | |
| 6,197,378 B1 | 3/2001 | Clark et al. | |
| 6,379,753 B1 | 4/2002 | Soane et al. | |
| 6,503,313 B2 | 1/2003 | Matakawa et al. | |
| 6,617,267 B2 | 9/2003 | Soane et al. | |
| 6,794,010 B1 | 9/2004 | Yamaguchi et al. | |
| 6,855,772 B2 * | 2/2005 | Linford et al. | 525/276 |
| 2003/0217824 A1 | 11/2003 | Bottorff | |
| 2005/0096444 A1 | 5/2005 | Lee et al. | |

FOREIGN PATENT DOCUMENTS

| | | | |
|---|---|---|---|
| GB | 1 541 670 A | | 3/1979 |
| JP | 54-132694 | * | 10/1979 |
| JP | 54-132694 A | | 10/1979 |

OTHER PUBLICATIONS

G.G. Odian; "Principles of Polymerization"; Wiley Interscience; 1991, 3rd Edition; pp. 715-725.
Jiri George Drobny; "Technology of Fluoropolymers"; CRC Press; 2001; Chapter 6.
J.M. Gess, et al.; "The Sizing of Paper"; TAPPI Press; 2005; 3rd Edition; Chapter 8.

* cited by examiner

*Primary Examiner* — Ling-Siu Choi
(74) *Attorney, Agent, or Firm* — Sughrue Mion, PLLC

(57) ABSTRACT

A repellent agent composition including an aqueous continuous phase and a graft copolymer dispersed in the aqueous continuous phase. The graft copolymer has a water soluble polymer trunk having hydroxyl groups and branches having fluorinated groups bonded to the polymer trunk at a carbon atom substituted with a hydroxyl group. Also disclosed is a method of making the graft copolymer and a substrate treated with the repellent composition.

23 Claims, No Drawings

REPELLENT COMPOSITION CONTAINING GRAFT COPOLYMER, GRAFT COPOLYMER AND METHOD OF PREPARING GRAFT COPOLYMER

This application is a 371 of PCTJP2006/315890 filed Aug. 4, 2006, which claims benefit of U.S. Provisional Application No. 60/705,499 filed Aug. 5, 2005, the above-noted applications incorporated herein by reference.

BACKGROUND OF THE INVENTION

1. Field of the Invention

In one facet, this invention relates to a graft copolymer and repellent composition containing the same, where opposing chemical attributes may be combined into one molecule, such as a hydrophilic portion and a hydrophobic portion. A graft copolymer comprises both a trunk portion and extensions (grafts) from that trunk. In another facet, this invention relates to a method of preparing the graft copolymer, being brought about in a continuous phase using a free radical or ionic initiation to begin a polymerization of extensions from the trunk, where the trunk and graft compositions and the number and length of the grafts are all controlled to deliver specific structures desirable for the graft polymer's end use performance. In an additional facet, the repellent composition of this invention is applied to a substrate, whose end use properties are enhanced by application of the composition in some desirable aspect, such as oil, grease, and/or water repellency. The substrate thus treated also retains desirable properties of its untreated state, such as porosity or surface tactility.

2. Description of the Related Art

Products containing perfluorocarbon groups have a long history of providing fluid repellency to a variety of substrates, including paper, textile, carpet, and nonwoven applications (e.g., "Technology of Fluoropolymers", J. G. Drobny, CRC Press, 2001, Chapter 6). In particular, fluorochemical-containing treatments have been beneficially used for treating paper substrates for the express purpose of improving the paper's resistance to penetration by grease and oil. This oleophobicity is useful in a variety of paper applications for quick service restaurant food wrap and pet food bags, as well as carbonless fan-apart forms and other specialty applications ("The Sizing of Paper", J. M. Gess & J. M. Rodriquez ed, TAPPI Press, 2005, Chapter 8)

Graft copolymers may comprise numerous types of structures. Typically, graft and block copolymers are both presented as having long sequences of 2 or more types of monomers. A general discussion of graft copolymers appears in the textbook "Principles of Polymerization", G. G. Odian, Wiley Interscience, 1991, $3^{rd}$ edition, page 715-725. This discussion teaches, among several paths, that the ceric (IV) ion may be used to cause trunk polymers containing secondary alcohols, such as cellulose or polyvinyl alcohol, to undergo redox reactions with the ceric ion. The resulting polymer radicals are capable of initiating polymerization, thus creating homo or copolymer branches off of the main polymer chain. The resulting branched copolymer is one type of graft copolymer. Graft copolymers provide a vehicle for combining attributes of widely varying monomers into a structure where those attributes are retained.

Kang-gen Lee et. al. (U.S. Pat. No. 6,136,896) teach graft copolymers using diorganosiloxanes. These graft copolymers, however, are not built from a trunk, as the trunk is assembled during polymerization of various 'macromonomers' with other monomers to create the graft copolymer, and do not have application for oil and grease resistance.

Matakawa (U.S. Pat. No. 6,503,313) teaches a graft copolymer incorporating fluorinated and siloxane groups. The resulting graft copolymer is similar in structure to that of Kang-gen Lee. The resulting composition finds primary end use in exterior building coatings, and the organic solvent utilized in the polymerization would not make it suitable for the present end uses. Hinterwaldner et. al. (U.S. Pat. No. 5,070,121) teaches a graft copolymer primarily for barrier protection and corrosion resistance. This graft polymer is a melt film that self-polymerizes during application and includes oligomeric material, which would not be suitable for food contact applications considered in the present invention.

Walker (U.S. Pat. No. 4,806,581) teaches a graft copolymer prepared through bulk polymerization. While this reference includes unspecified fluoroacrylates as one of the potential monomers, the bulk polymerization pathway is the primary teaching, which is not physically realistic for preparation of polymers of the present invention. Others teach about block copolymers of fluoroacrylates for treatment of textiles (U.S. Pat. Nos. 6,855,772, 6,617,267, 6,379,753), however, these graft copolymers, which may contain fluoroacrylates, are prepared based on monomeric or polymeric maleic anhydride. The maleic anhydride creates the reactive bonding site to textile fibers. These reactive groups present an inherent instability in treatment solutions, and are hence at a disadvantage from the present invention.

Relative to the present invention, Miller et. al. (U.S. Pat. No. 5,362,847) teaches a graft copolymerization utilizing an ethylene oxide and/or propylene oxide trunk onto which is grafted a fluoroacrylate monomer. The resulting graft copolymer is then combined with a cross-linking agent to create a durable coating. Unlike the present invention, this reference conducts the graft polymerization in a toxic organic solvent, such as xylene. Removal of organic solvents from the resulting polymers is problematic, with residual solvent being a regulatory concern.

US Patent Application Publication US 2005/0096444 A1 to Lee et al. discloses a graft copolymer created from an assembly of vinyl containing monomers and macromonomers. This is similar in character to Kang-gen Lee's work referenced earlier. These macromonomer polymers are polymerized in a toxic organic solvent after functionalization of the macromonomer with acid chloride. The hydrocarbon trunk chain assembled as a result of the organic solvent polymerization does not contain hydroxyl groups nor is it capable of acting as a self-emulsifying agent as described in the present invention.

The use of cerium as an initiator for use in creating graft copolymers is disclosed in U.S. Pat. No. 2,922,768. Cerium initiation has been broadly used for the grafting of natural polymers, such as starch and cellulose (U.S. Pat. Nos. 4,375,535, 4,376,852, 5,130,394, and 5,667,885), however, the incorporation of fluorinated functionality has not been disclosed.

3. Problems Solved by the Invention

The benefits of substrate treatment by fluorochemicals are widely appreciated. A difficulty often arises in the treatment of the substrate to produce those benefits. The present invention solves the problem of the use of emulsifiers to effect the emulsion polymerization of many commercial fluorinated copolymers. These emulsifiers can interfere in numerous ways to reduce the performance of the fluorinated copolymer on a substrate. The present graft copolymer also solves the problem of having good bonding to substrates, through the trunk polymer's hydrogen bonding capacity. The need for good hydrogen bonding co-monomers, such as acrylamide, which has regulatory concerns, is reduced or eliminated. In addition, decreasing the degree of hydrolysis of the trunk polymer can be used to improve adhesion to hydrophobic surfaces. The present invention is also capable of delivering advantageous performance from fluorinated vinyl monomers of a wide variety of perfluorinated chain lengths, due to the structure of the grafts. Fluorinated copolymer performance can suffer when the fluoroalkyl chain length is shortened in conventional polymers. The present invention reduces or eliminates the need for co-solvents that increase the hazardous volatile organic compound content of other fluorinated copolymers.

The fluorinated graft copolymer of the present invention solves the problem of incorporating co-monomers of widely divergent reactivity ratios to vinyl perfluoroacrylates, in that the graft polymerization technique can be applied to the present invention multiple times. This allows for incorporating a wide variety of copolymers along one trunk polymer without the difficulties normally experienced during a conventional polymerization. The present invention also solves the difficult problem of how to incorporate grafts along an existing trunk chain. There is no need to use dangerous, highly reactive intermediates such as acid chlorides to create these grafted chains.

The fluorinated graft copolymer of the present invention may reduce the need to use toxic and/or volatile organic compound (V.O.C.) contributing organic solvents to affect the polymerization of the fluorinated copolymer, because the continuous phase is water. Hence these graft copolymers are inherently miscible in nearly all treatment systems, as these are primarily aqueous-based. The fluorinated graft copolymer of the present invention may extend the range of application of repellent treatment by eliminating the need to heat cure the treated substrate after treatment in order to develop the desired repellency properties.

SUMMARY OF THE INVENTION

It is therefore an object of the present invention to provide a graft copolymer (1) and repellent composition containing the same, which provides the above described benefits in terms of both safety and performance, and to a method of making the graft copolymer.

According to a first aspect, the above objects of the present invention have been achieved by providing (2) a repellent agent composition comprising: an aqueous continuous phase; and a graft copolymer dispersed in said aqueous continuous phase, said graft copolymer comprising a water soluble polymer trunk having hydroxyl groups and branches having fluorinated groups bonded to the polymer trunk at a carbon atom substituted with a hydroxyl group.

In a preferred embodiment, (3) the repellent composition contains no more than 10% by weight of total product of emulsifier(s). Also in a preferred embodiment, (4) the repellent composition contains no more than 50% by weight of total product of solvent(s).

According to a second aspect, the above objects of the present invention have been achieved by providing (5) a method of preparing a graft copolymer, which comprises: chain polymerizing a trunk polymer having hydroxyl groups with monomers capable of chain polymerizing with said trunk polymer to form a graft copolymer including branches from the trunk polymer derived from said monomers, wherein said chain polymerization is conducted in continuous phase, in the presence of a polymerization initiator under neutral to acidic pH conditions, and substantially in the absence of emulsifying agents.

In a preferred embodiment, (6) the polymerization initiator comprises a redox system including an oxidizing agent and a reducing agent where the trunk polymer is the reducing agent and the oxidizing agent comprises a multivalent metal ion.

In yet another preferred embodiment, (7) the multivalent metal ion serving as an oxidizing agent comprises $Ce^{4+}$.

In still yet another preferred embodiment, (8) the trunk polymer is water soluble or water dispersible.

In still yet another preferred embodiment, (9) the continuous phase is an aqueous continuous phase.

In still yet another preferred embodiment, (10) the monomers comprise fluorine-containing monomers.

In still yet another preferred embodiment, (11) the continuous phase is an aqueous continuous phase and said monomers, namely, fluorine-containing monomers as described in (10) above, are soluble or dispersible in the continuous phase in the presence of the trunk polymer.

In still yet another preferred embodiment, (12) the fluorine-containing monomers of (10) above are not soluble or dispersible in the continuous phase in the absence of the trunk polymer.

According to a third aspect, the above objects of the present invention have been achieved by providing (13) a substrate treated with the composition of (2) above.

In a preferred embodiment, (14) the substrate is a fibrous substrate selected from the group consisting of paper, textiles, carpet and nonwoven materials.

In yet another preferred embodiment, (15) the substrate is nonfibrous selected from the group consisting of metals, plastics, leathers, composites, and glasses, both treated and untreated, porous and non porous.

In yet another preferred embodiment, (16) the treated substrate is prepared by applying a solution of the composition of (2) above, optionally in combination with other compounds, via any of spraying, dipping and padding.

In still yet another preferred embodiment, (17) the treated substrate is prepared by incorporating the composition of (2) above while forming said substrate or by incorporating the composition of (2) above into components constituting said substrate.

In still yet another preferred embodiment (18), the repellent composition of (2) above further comprises a salt of a type and in an amount sufficient to enhance exhaustion of the graft copolymer onto a treated fibrous substrate prepared by immersing the substrate in the repellent agent composition, wherein the substrate is heated either before or after or both before and after immersing in the repellent agent composition to remove excess water.

In still yet another preferred embodiment (19), the invention provides a treated fibrous substrate prepared by immersing a fibrous substrate in the repellent agent composition of (2), said composition being delivered at a pH below 3.5 to enhance exhaustion of graft copolymer onto the substrate, and heating the substrate to remove excess water.

In still yet another preferred embodiment (20), the invention provides a substrate treated with the composition of (18) above.

In still yet another preferred embodiment, (21, 22, 23) the treated substrate of (13, 19, 20) is further subjected to one or both of washing and drying after treatment with the graft copolymer.

DETAILED DESCRIPTION OF THE INVENTION

The graft copolymer of the invention may contain both hydrophilic and hydrophobic and/or lipophobic portions. The graft copolymers of the present invention contain a trunk polymer. An embodiment of this trunk polymer is hydrophilic and water soluble or dispersible in its unmodified state. A preferred embodiment of the trunk polymer contains hydroxyl groups. In a further preferred embodiment, the trunk polymer contains secondary hydroxyl groups substituted on the carbons of the primary hydrocarbon trunk polymer chain. Examples of these types of trunk polymers may be natural and modified starches, celluloses, hemi-celluloses, synthetic polyvinyl alcohols, and polyvinyl alcohols/co vinyl acetates. The trunk polymer may also be protein-based.

Preferably, the trunk polymer comprises polyvinyl alcohol/co-vinyl acetate and more preferably contains a predominant fraction of units derived from polyvinyl alcohol. Vinyl alcohol monomer is not commercially available, so in one possible industrial route, vinyl acetate is polymerized via chain polymerization to a desired molecular weight. The resulting polyvinyl acetate (PVAc) can then be subjected to alcoholysis with methanol via a base-catalyzed reaction. The degree of alcoholysis is controlled to give a desired polyvinyl alcohol concentration. Polyvinyl alcohol/co-vinyl acetates are commercially available in a wide variety of degrees of alcoholysis and molecular weight, under such trade names as CELVOL.

The hydroxyl group content of the polymer trunk is such that the trunk polymer is water soluble or dispersible in its unmodified state. Generally, the polymer trunk may have 1 to 100 percent hydroxyl substitution, particularly, 50 to 100 percent hydroxyl group substitution of a polyvinyl acetate trunk polymer prepared from 100% polyvinyl acetate. In other variations on the trunk polymer chain, the hydroxyl concentration may vary from its natural state up to 100%, for example from 20% to 80% of the potential hydroxyl sites for that particular trunk polymer chain.

The hydroxyl groups substituted on the carbons of the primary hydrocarbon trunk polymer chain are preferably secondary hydroxyl groups. This composition may be obtained via the manufacturing process described above.

A description of the branches having fluorinated groups bonded to the polymer trunk at a carbon atom substituted with a hydroxyl group is included below with reference to fluorinated (and fluorine-free) monomers for use in synthesizing the graft copolymer. The number of branches having fluorinated groups per molecule of the graft copolymer depends on its intended use and application. Generally, the weight ratio of the polymer trunk to branches having fluorinated groups (derived, e.g., from vinyl monomers having a polyfluorinated group) may be from 1:99 to 99:1, preferably from 10:90 to 90:10, particularly 25:75 to 75:25. Other branches not containing fluorine (derived, e.g., from fluorine-free vinyl monomers) may also be present in an amount so as to still achieve the objects of the invention, generally in a weight ratio of up to 90% by weight, for example 10% to 60% of the graft copolymer. The fluorine-free monomers may also be copolymerized with the fluorinated monomers to create a copolymer graft chain. This graft chain may be random or block, linear or branched in character.

The amount of the graft copolymer in the repellent composition is generally from about 5 wt % to about 50 wt %. When present as a dispersion in the aqueous continuous phase, the graft copolymer particles have an average particle size (equivalent diameter) of from 0.05 μm to 2.0 μm. The graft copolymer preferably has a number average molecular weight of from about 1,000 to about 1,000,000, more preferably from about 20,000 to about 200,000.

In addition to the graft copolymer, the repellent composition may further contain additives intended to improve the stability and/or performance of the graft copolymer, without particular limitation so long as the objects of the invention are attained.

The continuous phase is generally water, but may further include additional co-solvents in an amount of up to 50% by weight, preferably up to 30% by weight, and most preferably up to 10% by weight, based on total product (i.e., the repellent composition). In another preferred embodiment, the repellent composition contains substantially no co-solvent (for example, the continuous phase consists of water). As used herein, the language "substantially contains no co-solvent" means that the repellent composition contains a solvent other than water in an amount up to 8% by weight, preferably up to 2% by weight, and most preferably contains no solvent other than water.

As used herein, the terms "water soluble" and "water dispersible" relative to the graft copolymer mean that the composition may either fully dissolve in water or form a stable colloidal dispersion.

Preferably, the repellent composition contains substantially no emulsifying agents such as fatty alcohol ethoxylates and other emulsifying agents known in this field of art. The term "contains substantially no emulsifying agents" as used herein means that the repellent composition contains less than 10 wt % (based on total product), more preferably less than 1 wt %, and most preferably contains no emulsifying agent (to detectable limits).

In accordance with the method of preparing the graft copolymer of the invention, monomers capable of chain polymerization are utilized to create extensions (grafts) off of the trunk polymer chain. These monomers in general may have significantly different character and/or performance attributes than the trunk polymer of the graft. A preferred embodiment is fluoroalkyl and non-fluoroalkyl groups with radically polymerizable terminal groups. The graft copolymer of the present invention incorporates one or more of these monomers to create the graft copolymer. A further preferred embodiment is the group of monomers of fluoroacrylates, silicoacrylates, aliphatic acrylates, and other functional acrylates, such as those containing amines, amides, and halides useful for end use performance.

The perfluoroalkyl group-containing (meth)acrylate, $R_fM$, may be represented by the following general formula:

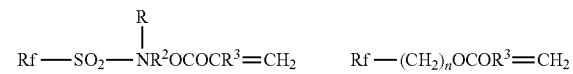

wherein Rf is a perfluoroalkyl group having 1 to 21 carbon atoms, $R^{18}$ is hydrogen, halogen (for example, fluorine, chlorine, bromine and iodine), or a methyl group, and $A^2$ is a divalent organic group.

Examples of the perfluoroalkyl group-containing (meth) acrylate include:

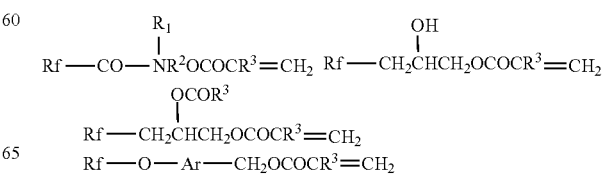

-continued $$Rf-SO_2(CH_2)_nOCOR^3=CH_2$$

wherein Rf is a perfluoroalkyl group having 1 to 21 carbon atoms, $R^1$ is hydrogen or an alkyl group having 1 to 10 carbon atoms, $R^2$ is an alkylene group having 1 to 10 carbon atoms, $R^3$ is hydrogen, halogen, or a methyl group, Ar is arylene group which optionally has a substituent group, and n is an integer of 1 to 10.

Specific examples of the perfluoroalkyl group-containing (meth)acrylate include the following.

$$CF_3(CF_2)_3(CH_2)_2OCOCH=CH_2$$

$$CF_3(CF_2)_3(CH_2)_2OCOCCl=CH_2$$

$$CF_3(CF_2)_3(CH_2)_2OCOC(CH_3)=CH_2$$

$$CF_3(CF_2)_3(CH_2)_2OCOCF=CH_2$$

$$CF_3(CF_2)_5(CH_2)_2OCOCH=CH_2$$

$$CF_3(CF_2)_5(CH_2)_2OCOC(CH_3)=CH_2$$

$$CF_3(CF_2)_5(CH_2)OCOCCl=CH_2$$

$$CF_3(CF_2)_7(CH_2)_2OCOCH=CH_2$$

$$CF_3(CF_2)_6(CH_2)_2OCOC(CH_3)=CH_2$$

$$(CF_3)_2CF(CF_2)_6(CH_2)_2OCOCH=CH_2$$

$$CF_3(CF_2)_7(CH_2)_2OCOC(CH_3)=CH_2$$

$$CF_3(CF_2)_7(CH_2)_2OCOCH=CH_2$$

$$CF_3(CF_2)_7SO_2N(CH_3)(CH_2)_2OCOCH=CH_2$$

$$CF_3(CF_2)_7SO_2N(C_2H_5)(CH_2)_2OCOC(CH_3)=CH_2$$

$$(CF_3)_2CF(CF_2)_6CH_2CH(OCOCH_3)CH_2OCOC(CH_3)=CH_2$$

$$(CF_3)_2CF(CF_2)_8CH_2CH(OH)CH_2OCOCH=CH_2$$

$$CF_3[C_6F_{10}(CF_2)_2]SO_2N(CH_3)(CH_2)_2OCOCH=CH_2$$

$$CF_3(CF_2)_3SO_2(CH_2)_3OCOCH=CH_2$$

$$CF_3(CF_2)_5SO_2(CH_2)_3OCOCH=CH_2$$

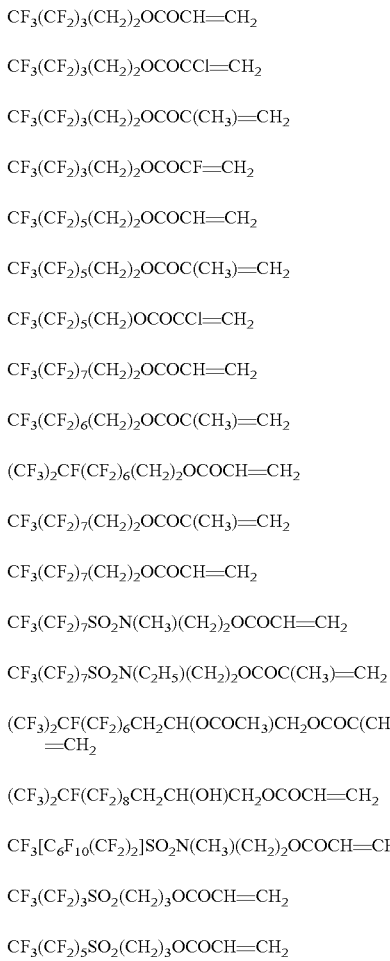

As a matter of course, at least two types of the fluoroalkyl group-containing (meth)acrylates can be used in combination.

The vinyl monomer having the perfluoroalkyl group may be another fluorine-containing monomer. Examples of the another fluorine-containing monomer include a fluorinated olefin (having, for example, 1 to 21 carbon atoms) such as $CF_3(CF_2)_7CH=CH_2$.

Examples of the fluorine-free vinyl monomer, VM, include a (meth)acrylate ester. The (meth)acrylate ester may be an ester between (meth)acrylic acid and an aliphatic alcohol such as a monohydric alcohol and a polyhydric alcohol (such as divalent alcohol).

Examples of the fluorine-free vinyl monomer include: (meth)acrylates such as methylmethacrylate, 2-ethylhexyl (meth)acrylate, cyclohexyl(meth)acrylate, lauryl (meth)acrylate, stearyl(meth)acrylate, hydroxyalkyl(meth)acrylate, tetrahydrofurfuryl (meth)acrylate, polyoxyalkylene (meth)acrylate, 3-chloro-2-hydroxypropyl(meth)acrylate, glycidyl (meth)acrylate, N,N-dimethylaminoethyl(meth)acrylate, N,N-diethylaminoethyl (meth)acrylate, benzyl(meth)acrylate, hydroxypropyl mono(meth)acrylate, 2-hydroxy-3-phenoxypropyl(meth)acrylate, 2-hydroxyethyl(meth)acrylate, glycerol mono(meth)acrylate, β-acryloyloxyethyl hydrogen succinate, β-methacryloyloxyethyl-hydrogen phthalate, 2-acryloyloxyethylhexahydrophthalic acid, 2-acryloyloxyethylphthalic acid, 2-acryloyloxyethyl-2-hydroxyethylphthalic acid, (meth)acrylic acid hydroxypropyltrimethylammonium chloride, dimethylaminoethyl(meth)acrylate, diethylaminoethyl(meth)acrylate, 2-acryloyloxyethyl dihydrogen phosphate, glycosyl ethyl (meth)acrylate, (meth)acrylamide, 2-hydroxy-3-acryloyloxypropyl(meth)acrylate, 2-methacryloyloxyethyl acid phosphate, and hydroxypivalic acid neopentyl glycol diacrylate; styrenes such as styrene and p-isopropylstyrene; (meth)acrylamides such as (meth)acrylamide, diacetone(meth)acrylamide, N-methylol(meth)acrylamide, N-butoxymethylacrylamide, and 2-acrylamide-2-methylpropanesulfonic acid; and vinyl ethers such as vinyl alkyl ether.

Examples thereof further include ethylene, butadiene, vinyl acetate, chloroprene, vinyl halide such as vinyl chloride, vinylidene halide, acrylonitrile, vinyl alkyl ketone, N-vinylcarbazole, vinyl pyrrolidone, 4-vinylpyridine, and (meth)acrylic acid.

The fluorine-free vinyl monomer may be a silicon-containing monomer (for example, (meth)acryloyl group-containing alkylsilane, (meth)acryloyl group-containing alkoxysilane, and (meth)acryloyl group-containing polysiloxane).

Examples of the silicon-containing monomer include: (meth)acryloxytrialkylsilane, (meth)acryloxy-trialkoxysilane, (meth)acryloxypolysiloxane, (meth)acryloxypropyltrialkylsilane, (meth)acryloxypropyl-trialkoxysilane, (meth)acryloxypropylpolysiloxane, allyltrialkylsilane, allyltrialkoxysilane, allylpoly-siloxane, vinyltrialkylsilane, vinyltrialkoxysilane, and vinylpolysiloxane.

The (meth)acryloxypropylpolysiloxane may be

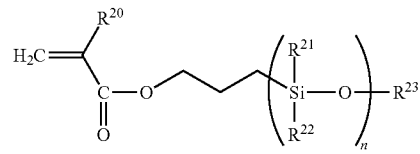

wherein $R^{20}$ is H or $CH_3$, $R^{21}$ is H or $CH_3$, $R^{22}$ is H or $CH_3$, $R^{23}$ is H or $CH_3$, and n is from 1 to 100 (for example, (meth)acryloxypropylpolydimethylsiloxane).

At least two types of the fluorine-free vinyl monomers can be also used in combination.

Creation of the polymeric grafts from the trunk is performed via initiation of a chain polymerization of the monomer via standard methods (radical or ionic) well known to those skilled in the art. In a preferred embodiment, an initiator that is soluble in the continuous phase is used to initiate chain polymerization starting at the trunk polymer and allowing for the polymerization reaction to proceed. A further preferred embodiment utilizes redox initiators for this purpose. An example is the use of ceric ion or other oxidizing agent, such as a multivalent ion selected from $V^{5+}$, $Cr^{6+}$ and $Mn^{3+}$ to form a free radical along the trunk chain of a polyvinyl alcohol, and the subsequent polymerization proceeding from that free radical.

Further examples of the polymerization initiator include a combination of a peroxide and a reducing agent, a combination of an inorganic reductant and an oxidant or an inorganic-organic redox pair, especially where the trunk polymer or fluorine-containing monomer may act as one component of the redox pair. Other examples are described by Odian, previously referenced. The content of the polymerization initiator depends on the trunk polymer and monomer selection, but is generally from 0.01% to 2.0% by weight of the composition.

A novel and unexpected aspect of the present invention is the unique ability of the trunk polymer, by the choice of its structure, to act as an emulsifying agent for the monomer(s) of this polymerization, which are potentially not soluble in the continuous phase. Not being bound to theory, it appears that the trunk polymer takes the place of surface active agents that would typically be required to stabilize monomer in the continuous phase to allow for polymerization. In conventional emulsion and microemulsion polymerizations, these surface active agents are difficult to remove after polymerization is completed, and can act to the detriment of the final polymer's performance and regulatory capacity. Due to the diverse nature of the monomers employed, it may still be necessary to add some emulsifiers and/or co-solvents which enhance the stability of either the polymerization or the resulting graft copolymer, but the amounts and types of these are significantly reduced.

Synthesis—Preparation of Graft Copolymer:

A further novel and unexpected aspect of the present invention is the mild conditions required to bring about the polymerization. A preferred embodiment of the present invention utilizes an aqueous continuous phase for the conduction of the graft polymerization. Depending on the selection of initiators and other components, the graft polymerizations of the present invention can take place at room temperature and atmospheric pressure conditions, or at elevated conditions. These polymerizations take place under mild agitation and proceed to a high degree of conversion without excessive effort in a reasonable amount of time. The resulting graft copolymer products are stable dispersions in the continuous phase.

Example 1

Generally, the reaction conditions suitable for practice of the invention are a temperature of from 15° C. to 80° C. at a pressure of 0 psig to 100 psig and a polymerization time of from 5 seconds to 72 hours. It is also preferred that the reaction take place under neutral to acidic pH conditions (for example, pH of 7 to 1).

Of particular interest in these reactions are the ratios of initiator to monomer, initiator to reactive site on trunk polymer, and monomer to reactive site on trunk polymer. An example polymerization of the present invention is:
1. Approximate total reaction volume=100 ml
2. Dissolve 10,000 MW, 80% hydrolyzed polyvinyl alcohol (PVA) in approximately 95 ml water, purge solution with $N_2$ at room temperature to about 6% solids PVA (mixing by propeller or stir bar, or by ultramizing or homogenizing)
3. Prepare Ceric Ammonium Nitrate (CAN) in water and purge with $N_2$ at room temperature
4. Purge fluoroacrylate monomer with $N_2$ at room temperature
5. Inject 5 ml of CAN solution into PVA solution while stirring
6. Inject a fixed volume of fluoroacrylate into PVA/CAN solution while stirring
7. Allow reaction to proceed at room temperature
8. Initiation complex (clear amber solution) lasts for 10 seconds to one or more hours depending on concentration ratios
9. When successful, opacity and latex formation occurs within 2 hours
10. The appearance of opaque white latex can remain constant after about 5-6 hours
11. Yield measured after 1 to 2 days Example 2

This example is the same as example 1, except reverse the order of steps 5 and 6. Inject the initiator after the addition of the graft monomer. In this example, additional agitation, through the use of propeller or stir bar or ultramixing or homogenizing, can be applied up to before the addition of the initiator.

Example 3

This example is the same as Example 1 or 2, except include 5% solids by total weight of tripropylene glycol cosolvent in step 2 of these examples.

Example 4

This example is the same as Example 1 or 2, except include 0.5% solids by total weight of ethoxylated fatty alcohol emulsifier in step 2 of these examples.

Example 5

This example is the same as Example 1 or 2, except include both 5% solids by total weight of triprolylene glycol and 0.5% solids by total weight of ethoxylated fatty alcohol emulsifier in step 2 of these examples.

One potential summary structure of the present invention is represented below, where RfM and VM have been described previously and n, m, o, p, q, r, s, and t all represent number of repeating units. The graft chains may be random, block, or some mixture thereof.

Example 6

This example is the same as Example 1 or 2, except exclude $N_2$ purge of steps 2, 3, and 4. Include an $N_2$ purge after all material has been injected.

Example 7

This example is the same as Example 1 or 2, except include co-monomer(s) injection at same step as fluoroacrylate monomer.

Example 8

This example is the same as Example 1 or 2, except include injection of fluoroacrylate monomer, co-monomer(s), and/or initiator part way through reaction. This may include a single or multiple injection(s) of each material during reaction.

One potential summary structure of the present invention is represented below, where $R_jM$ and VM have been described previously and n, m, o, p, q, r, s, and t all represent number of repeating units. The graft chains may be random, block, or some mixture thereof.

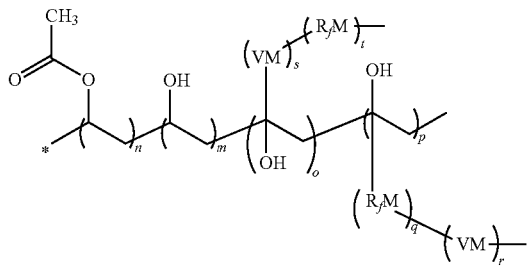

Preparation of Repellent Composition:

The graft copolymer, prepared as described above, is dispersed in water or an aqueous phase containing mainly water, in an amount of from 1% to 50% by weight of total using low-shear mechanical mixing. Other agents, such as but not limited to buffers, film forming agents, foaming agents, blocking agents, cross linkers, salts, biological control agents, retaining agents, blooming agents, stabilizers, water soluble polymers and/or binders may be further added to the repellent composition. The repellent composition thus prepared is stable and may be stored for use as described in further detail below.

The repellent composition may further contain a solvent or organic solvent or water soluble organic solvent at up to 50 parts of the total repellent composition. Specific examples of the water soluble organic solvent used for this purpose are acetone, ethylene glycol monoethyl ether acetate, ethylene glycol monoethyl ether, ethylene glycol monomethyl ether, ethylene glycol monobutyl ether, propylene glycol monomethyl ether, propylene glycol monomethyl ether acetate, dipropylene glycol monomethyl ether, tripropylene glycol monomethyl ether, propylene glycol butyl ether, propylene glycol dibutyl ether, ethyl-3-ethoxy propionate, 3-methoxy-3-methyl-1-butanol, 2-tert-butoxy ethanol, isopropyl alcohol, n-butyl alcohol, isobutyl alcohol, ethyl alcohol, ethylene glycol, propylene glycol, dipropylene glycol or triproylene glycol. At least two types of the water soluble organic solvent can be also used in combination.

The repellent composition may further contain a surfactant having nonionic, anionic, cationic, and/or amphoteric character in an amount of from 0.1 to 10 wt % of the total composition. The surfactant used for dispersing the polymer may be a cationic emulsifier, an anionic emulsifier, an amphoteric emulsifier or a nonionic emulsifier. The surfactant is preferably a mixture of nonionic emulsifiers or a mixture of anionic and nonionic or cationic and nonionic emulsifiers or a mixture of amphoteric and nonionic emulsifiers. In the case of the mixture, a preferable weight ratio of the nonionic emulsifiers is from 1:9 to 9:1. General chemical categories of the surfactant used for this purpose include, but are not limited to ethoxylated alcohols, alkyl phenols, ethoxylated fatty acids, ethoxylated fatty alcohols, ethoxylated fatty amines, ethoxylated glycerides, sorbitan esters, ethoxylated sorbitan esters, esters, phosphate esters, glycerin esters, block polymers, propoxylates, alkanol amides, amine oxides, alkyl amine oxides, lanolin derivatives, hydroxysultaines, amine amides, and ethoxylated propoxylated ethers for nonionics, fatty acid salts, sulfates, sulfonates, phosphates, ether carboxylates, naphthalene sulfonates, formaldehyde condensates, and carboxylates for anionics, and alkyl amine salts and quaternary ammonium salts for cationics, and alkyl betaines, alanines, imidazolinium betaines, amide betaines, acetic acid betaines, and amine oxides for amphoterics. Specific examples of the nonionic emulsifier include a condensation product of ethylene oxide with hexadecanol, n-alkanol, sec-alkanol, t-alkanol, oleic acid, alkane($C_{12}$-$C_{16}$)thiol, sorbitan monofatty acid ($C_7$-$C_{19}$) or alkyl($C_{12}$-$C_{18}$)amine and the like, and glycol, alkyl glycol ether, diglycol alkyl ether, ketones and esters. Specific examples of the anionic emulsifier include sodium alkyl($C_{12}$-$C_{18}$)sulfate, alkane($C_{12}$-$C_{18}$)hydroxysulfonic acids and alkene derivative sodium salts, poly(oxy-1,2-ethanediyl), alpha-sulfo-omega-(9-octadecenyloxy)-ammonium salt and the like. Specific examples of the cationic emulsifier include dodecyl trimethyl ammonium acetate, trimethyl tetradecyl ammonium chloride, hexadecyl trimethyl ammonium bromide, trimethyl octadecyl ammonium chloride, (dodecylmethyl-benzyl)trimethyl ammonium chloride, benzyl dedecyl dimethyl anmonium chloride, dialkyl dimethyl ammonium chloride, methyl dodecyl di(hydropolyoxyethylene)ammonium chloride, benzyl dodecyl di(hydropolyoxyethylene)ammonium chloride, benzyl dodecyl di(hydropolyoxyethylene)ammonium chloride and N-[2-(diethylamino)ethyl]oleamide hydrochloride. Specific examples of the amphoteric emulsifier include lauryl betaine, lauryl dimethylaminoacetic acid betaine, stearyl betaine, and laurylcarboxymethylhydroxyethylimidazolinium betaine. At least two types of the surfactant can be also used in combination.

The repellent composition of the present invention may also contain stabilizers to maintain the uniformity of the dispersion. These stabilizers may be polymeric, with specific examples including hydroxypropylcellulose, poly(ethylene oxide), sodium styrene sulfonate, or poly(acrylic acid) sodium salt.

The dispersion according to the present invention can be applied to the substrate preferably by coating, dipping, spraying, padding, roll coating, or combination of these procedures. For example, a solution having a solids content of 0.1 to 10% by weight of the present invention can be used. An example prepared for the treatment of a cellulose (paper) substrate may consist of an aqueous mixture of cooked ethylated corn starch (2% to 20% by weight of solution) combined with the fluorochemical (0.1 to 10% by weight of total solution) of the present invention. An example prepared for the treatment of nylon carpet substrate may contain an aqueous mixture of a stain blocking agent (0.1% to 10% by weight of substrate) and/or a foaming agent (0.1% to 10% by weight of total solution) combined with the fluorochemical (0.1% to 10% by weight of total solution) of the present invention.

Preparation of Treated Substrates:

The application of these graft copolymers to substrates may proceed along all means familiar to those skilled in the art without particular limitation. The graft copolymers of the present invention may be applied to substrates for the purpose of enhancing certain performance characteristics while at the same time not altering other essential characteristics of that substrate via spraying, dipping, padding, or otherwise treating these substrates. After this treatment, these substrates may be further processed via washing, drying and/or subjected to additional finishing treatments. Another novel and unexpected aspect of the present invention is the stability of the graft copolymers during these treatment applications. An example is the treatment of paper or textiles, where the graft copolymer of the present invention is added to a solution containing multiple other treatments and/or compounds to form a repellent composition which is then applied to a paper or textile substrate. The high level of emulsifiers present in existing repellency treatment materials is often detrimental to the chemical and physical stability of this solution. Also, the uniformity of the substrate treatment may be negatively impacted by this solution instability.

Herein, the wordings "treatment of the substrates with the composition" means that the composition is applied to the substrates, and the wordings "treatment of the substrates with the composition" gives the result that the graft copolymer contained in the composition is adhered to the substrates.

The amount of graft copolymer incorporated into the treated substrate depends on the nature of the substrate, the composition of the graft copolymer and intended application. A treatment solution is prepared as previously discussed. This solution can be applied to the substrate preferably by coating, dipping, spraying, padding, roll coating, or a combination of these procedures. As an example of the padding application method, the substrate is padded (dipped) in a bath of the substrate solution, and then excess liquid is usually removed by a squeezing roll to give a dry pickup amount (the weight of dry polymer on the substrate) of from 0.01 to 10% by weight based on the weight of the substrate. Then, the treated substrate is preferably heated at 100-200° C. U.S. Patent Application Publication No. 2003/0217824 to Bottorff describes various treatment methods and performance evaluation tests for paper as a substrate, and is incorporated herein by reference. U.S. Pat. No. 6,794,010 to Yamaguchi describes various treatment methods and performance evaluation tests for carpet as a substrate, and is incorporated herein by reference. U.S. Pat. No. 5,614,123 to Kubo describes various treatment methods and performance evaluation tests for textile as a substrate, and is incorporated herein by reference. U.S. Pat. No. 5,688,157 to Bradley describes various performance evaluation tests for nonwoven fabrics as a substrate, and is incorporated herein by reference. U.S. Pat. No. 5,688,157 to Bradley discusses internal treatment of nonwoven fabrics with fluorochemicals, while the present invention may also be applied topically, as discussed in U.S. Pat. No. 5,834,384 to Cohen, which is incorporated herein by reference. Another novel and unexpected aspect of the present invention is that drying of any of the treated substrates may occur at room temperature, with the desired repellency properties being imparted to the substrate.

In another preferred embodiment, the treated substrate is prepared by incorporating the repellent composition while forming the substrate or by incorporating the repellent composition into components constituting the substrate. For example, during the formation process of paper, the fluorochemical of the present invention may be added to an aqueous dilute cellulose fiber solution, along with a polymeric retaining agent, immediately before the formation of the paper. This paper is then further pressed, surface treated or coated, and dried. The drying may occur under either elevated or room temperatures. The paper thus treated with the fluorochemical composition of the present invention will show increased resistance to oil, grease, and/or water penetration even when the paper is folded or creased, exposing the cellulose fibers. Another example of a non-surface treatment may be in the formation of nonwoven materials (See U.S. Pat. No. 5,688,157, discussed above), where the fluorochemical of the present invention is combined with the materials being compounded and a blooming agent prior to extrusion/spinning.

In another preferred embodiment, the treated substrate is prepared by exhausting the graft copolymer onto the substrate. U.S. Pat. No. 6,197,378 to Clark describes various treatment methods, formulations, and tests for the exhaust application, and is incorporated herein by reference. The bath prepared for exhaust application typically requires the addition of a metal salt such as but not limited to magnesium sulfate, sodium chloride, potassium chloride, sodium sulfate, calcium chloride barium chloride, zinc sulfate, copper sulfate, aluminum sulfate, and chromium sulfate. The bath composition pH value can be 0.5 or higher, and the substrate is exposed to steam either before or after or both before and after treatment in the bath. Other components can also be included in the bath, such as stain blockers and acids required to adjust pH of the bath. In another preferred embodiment, the treated substrate is prepared by exhausting the graft copolymer onto the substrate. U.S. Pat. Nos. 5,851,595 and 5,520,962 to Jones describe various treatment methods, formulations, and tests for the exhaust application, and is incorporated herein by reference. The pH of the bath should be below 3.5. Excess water from the bath solution is removed by heating the substrate to affect the exhausting of the graft copolymer onto the substrate.

Examples 9 Through 16

Generally, the treatment conditions for treating a given substrate are as described above. In specific application to paper, for either internal or surface treatment of the paper substrate, treatment is accomplished by addition of the graft copolymer and other additives known to the art into an aqueous solution(s). For internal treatment, the aqueous solution(s) is mixed with the wood pulp fibers before formation of the paper web. For surface treatment, an aqueous solution is applied to a formed sheet of paper by either dipping and pressing or spray application.

Surface treatment of paper and board is typically accomplished through the use of a size press consisting of 2 soft covered rolls upon which a solution is applied and between which the continuous sheet of paper passes. A laboratory treatment apparatus was used for application of examples 9 through 16. The apparatus and paper used yielded a 75% wet pick up as directly measured on the equipment. A solution containing enough graft polymer to achieve the treatment level was used for each example. The results are summarized below in Table 1 below.

Table 1

| Graft copolymer treatment of paper | | |
|---|---|---|
| Formulation | Solids Treatment Level | Performance (TAPPI T 559 pm-96) |
| 2-(perfluorobutyl)ethyl acrylate (9F-SFA) | 0.2% | 3.0 |
| 9F-SFA | 0.5% | 4.5 |
| 9F-SFA/methylmethacrylate | 0.2% | 5.0 |
| 9F-SFA/methylmethacrylate | 0.5% | 5.0 |
| 2-(perfluorobutyl)ethyl chloroacrylate (9F-SFClA) | 0.2% | 4.0 |
| 9F-SFClA | 0.5% | 5.5 |
| 9F-SFClA/Stearylmethacrylate | 0.2% | 5.0 |
| 9F-SFClA/Stearylmethacrylate | 0.5% | 8.0 |

The repellency performance delivered through the application of the graft copolymers of the present invention is similar or superior to those of conventional repellant materials when applied to substrates. This repellency pertains to any of those traditionally considered for this application, such as water, oil, grease, stain, soil, and any others known to those skilled in the art. This repellency may also be considered durable to repeated exposures of the substrate to the material to be repelled.

It should further be apparent to those skilled in the art that various changes in form and detail of the invention as shown and described above may be made. It is intended that such changes be included within the spirit and scope of the claims appended hereto.

The invention claimed is:

1. A graft copolymer comprising a water soluble polymer trunk having hydroxyl groups and branches having fluorinated groups bonded to the polymer trunk at a carbon atom substituted with a hydroxyl group, the water soluble polymer trunk having 50 to 100 percent hydroxyl group substitution of a polyvinyl acetate trunk polymer prepared from 100% polyvinyl acetate.

2. A repellent agent composition comprising:
an aqueous continuous phase; and
a graft copolymer dispersed in said aqueous continuous phase, said graft copolymer comprising a water soluble polymer trunk having hydroxyl groups and branches having fluorinated groups bonded to the polymer trunk at a carbon atom substituted with a hydroxyl group, the water soluble polymer trunk having 50 to 100 percent hydroxyl group substitution of a polyvinyl acetate trunk polymer prepared from 100% polyvinyl acetate.

3. The repellent agent composition as claimed in claim 2, where emulsifier(s) can be contained in an amount up to 10% by weight of total product.

4. The repellent agent composition as claimed in claim 2, where solvent(s) can be contained in an amount up to 50% by weight of total product.

5. The repellant agent composition of claim 2, further comprising a salt of a type and in an amount sufficient to enhance exhaustion of the graft copolymer onto a treated fibrous substrate prepared by immersing the substrate in the repellent agent composition, wherein the substrate is heated either before or after or both before and after immersing in the repellent agent composition to remove excess water.

6. A method of preparing a graft copolymer, said graft copolymer comprising a water soluble polymer trunk having hydroxyl groups and branches having fluorinated groups bonded to the polymer trunk at a carbon atom substituted with a hydroxyl group, the water soluble polymer trunk having 50 to 100 percent hydroxyl group substitution of a polyvinyl acetate trunk polymer prepared from 100% polyvinyl acetate,
which method comprises:
chain polymerizing a trunk polymer having hydroxyl groups with monomers capable of chain polymerizing with said trunk polymer to form a graft copolymer including branches from the trunk polymer derived from said monomers,
wherein said chain polymerization is conducted in continuous phase, in the presence of a polymerization initiator, under neutral to acidic pH conditions.

7. The method as claimed in claim 6, wherein said polymerization initiator comprises a redox system including an oxidizing agent and a reducing agent where the trunk polymer is the reducing agent and the oxidizing agent comprises a multivalent metal ion.

8. The method as claimed in claim 7, wherein the multivalent metal ion comprises $Ce^{4+}$.

9. The method as claimed in claim 6, wherein said trunk polymer is water soluble or water dispersible.

10. The method as claimed in claim 6, wherein said continuous phase is an aqueous continuous phase.

11. The method as claimed in claim 6, wherein said monomers comprise fluorine-containing monomers.

12. The method as claimed in claim 11, wherein said continuous phase is an aqueous continuous phase and said monomers are soluble or dispersible in the continuous phase in the presence of the trunk polymer.

13. The method as claimed in claim 12, wherein said monomers are not soluble or dispersible in the continuous phase in the absence of the trunk polymer.

14. A treated substrate, wherein the substrate is treated with the composition of claim 2.

15. The treated substrate of claim 14, wherein the substrate is a fibrous substrate selected from the group consisting of paper, textiles, carpet and nonwoven materials.

16. A treated substrate of claim 14, wherein the substrate is nonfibrous selected from the group consisting of metals, plastics, leathers, composites, and glasses, both treated and untreated, porous and non porous.

17. A treated substrate, prepared by applying to a substrate the composition of claim 2, optionally in combination with other compounds, via any of spraying, dipping and padding.

18. A treated substrate, prepared by incorporating into a substrate the composition of claim 2 while forming said substrate or by incorporating the composition of claim 2 into components constituting said substrate.

19. The treated substrate of claim 14, further subjected to one or both of washing and drying.

20. A treated fibrous substrate prepared by immersing a fibrous substrate in the repellent agent composition of claim 2, said composition being delivered to the substrate at a pH below 3.5 to enhance exhaustion of graft copolymer onto the substrate, and heating the substrate to remove excess water.

21. The treated substrate of claim 20, further subjected to one or both of washing and drying.

22. A treated substrate, wherein the substrate is treated with the composition of claim 5.

23. The treated substrate of claim 22, further subjected to one or both of washing and drying.

* * * * *